(12) United States Patent
Mortensen et al.

(10) Patent No.: US 12,344,525 B2
(45) Date of Patent: *Jul. 1, 2025

(54) SYNTHETIC FUELS BY ELECTRICALLY HEATED STEAM METHANE REFORMING

(71) Applicant: TOPSOE A/S, Kgs. Lyngby (DK)

(72) Inventors: Peter Mølgaard Mortensen, Roskilde (DK); Kim Aasberg-Petersen, Allerød (DK); Charlotte Stub Nielsen, Holte (DK)

(73) Assignee: TOPSOE A/S, Kgs. Lyngby (DK)

( * ) Notice: Subject to any disclaimer, the term of this patent is extended or adjusted under 35 U.S.C. 154(b) by 404 days.

This patent is subject to a terminal disclaimer.

(21) Appl. No.: 17/782,391

(22) PCT Filed: Dec. 2, 2020

(86) PCT No.: PCT/EP2020/084291
§ 371 (c)(1),
(2) Date: Jun. 3, 2022

(87) PCT Pub. No.: WO2021/110754
PCT Pub. Date: Jun. 10, 2021

(65) Prior Publication Data
US 2023/0002223 A1 Jan. 5, 2023

(30) Foreign Application Priority Data
Dec. 4, 2019 (EP) ...................................... 19213425

(51) Int. Cl.
*C01B 3/38* (2006.01)
*C01B 3/50* (2006.01)
*C10G 2/00* (2006.01)

(52) U.S. Cl.
CPC .............. *C01B 3/382* (2013.01); *C01B 3/388* (2013.01); *C01B 3/50* (2013.01); *C10G 2/30* (2013.01);
(Continued)

(58) Field of Classification Search
CPC ............ C01B 3/382; C01B 2203/0227; C01B 2203/0244; C01B 2203/0415;
(Continued)

(56) References Cited

U.S. PATENT DOCUMENTS 9,353,022 B2 5/2016 Lindell et al.
9,828,246 B2 11/2017 Dybkjær et al.
(Continued)

FOREIGN PATENT DOCUMENTS

EP 0516441 A1 12/1992
JP H056120 U 1/1993
(Continued)

OTHER PUBLICATIONS

International Search Report (PCT/ISA/210) and Written Opinion (PCT/ISA/237) mailed on Feb. 9, 2021, by the European Patent Office as the International Searching Authority for International Application No. PCT/EP2020/084291. (15 pages).
(Continued)

*Primary Examiner* — Jafar F Parsa
(74) *Attorney, Agent, or Firm* — Boone IP Law

(57) ABSTRACT

A method for producing a synthesis gas for use in the production of a hydrocarbon product, particularly a synthetic fuel, the method including the steps of: providing a hydrocarbon feed gas; optionally, purifying the hydrocarbon feed gas in a gas purification unit; optionally, prereforming the hydrocarbon feed gas together with a steam feedstock in a prereforming unit; carrying out steam methane reforming in a reforming reactor heated by means of an electrical
(Continued)

power source; providing the synthesis gas to a synthetic fuel synthesis unit, preferably a Fischer-Tropsch synthesis unit, for converting the synthesis gas into hydrocarbon product and producing a tail gas. Also, a system for producing a synthesis gas for use in the production of a hydrocarbon product, particularly a synthetic fuel.

18 Claims, 5 Drawing Sheets

(52) U.S. Cl.
CPC .............. *C01B 2203/0227* (2013.01); *C01B 2203/0244* (2013.01); *C01B 2203/0415* (2013.01); *C01B 2203/0485* (2013.01); *C01B 2203/062* (2013.01); *C01B 2203/085* (2013.01); *C01B 2203/0894* (2013.01); *C01B 2203/1011* (2013.01); *C01B 2203/1023* (2013.01); *C01B 2203/1241* (2013.01); *C01B 2203/142* (2013.01); *C01B 2203/143* (2013.01); *C01B 2203/148* (2013.01); *C01B 2203/1614* (2013.01); *C01B 2203/1628* (2013.01); *C10G 2400/04* (2013.01)

(58) Field of Classification Search
CPC ...... C01B 2203/0485; C01B 2203/062; C01B 2203/085; C01B 2203/1011; C01B 2203/1241; C10G 2/30; C10G 2/32; C10G 2400/04
See application file for complete search history.

(56) References Cited

U.S. PATENT DOCUMENTS

| | | |
|---|---|---|
| 2003/0134911 A1 | 7/2003 | Schanke et al. |
| 2007/0010590 A1 | 1/2007 | Abbott et al. |
| 2015/0152019 A1 | 6/2015 | Lindell et al. |
| 2020/0354216 A1 | 11/2020 | Mortensen |

FOREIGN PATENT DOCUMENTS

| | | |
|---|---|---|
| WO | 2004096952 A1 | 11/2004 |
| WO | 2013033812 A1 | 3/2013 |
| WO | 2019110268 A1 | 6/2019 |

OTHER PUBLICATIONS

Extended European Search Report dated Jun. 4, 2020, issued by the European Patent Office in corresponding European Application No. 19213425.2. (8 pages).

"New Clean Coal Technology Innovation and Practice Essays", Qiwen Sun, p. 501, Beijing: China Coal, Industry Publishing House, Sep. 2012, 9 pages—Concise Explanation of Relevance.

"New Approaches and Technologies for Energy Conservation and Emission Reduction," Shanghai Federation of Economic Organizations, p. 196, Shanghai: East China University of Science and Technology Press, May 2010, 2 page—Concise Explanation of Relevance.

"Introduction to Energy and Chemical Technology", Xiaoming Gao, p. 79, Xian: Shanxi Science and Technology Press, Jun. 2017, 5 pages—Concise Explanation of Relevance.

Office Action (the First Office Action) issued on Apr. 7, 2023, by the China National Intellectual Property Administration in corresponding Chinese Patent Application No. 2020800841142, with English Translation, 25 pages.

SYNTHETIC FUELS BY ELECTRICALLY HEATED STEAM METHANE REFORMING

FIELD OF THE INVENTION

Embodiments of the invention generally relate to a method and system for producing a synthesis gas from a hydrocarbon feed gas such as methane rich gas preferably having 80% vol. or more of methane, in particular natural gas, where the synthesis gas is produced by electrically heated steam methane reforming and said synthesis gas is used for the production a hydrocarbons product, in particular a synthetic fuel such as diesel by subsequent Firscher-Tropsch synthesis. The invention relates also to a method and system for producing a synthesis gas for use in the production of a hydrocarbon product, in which the synthesis gas is produced by using electrically heated steam methane reforming and autothermal reforming. Tail gas from the Firscher-Tropsch synthesis may be recycled to said electrically heated steam methane reforming and/or said autothermal reforming.

BACKGROUND

The classical approach to the production of synthesis gas (syngas) involves steam reforming of a hydrocarbon feed gas, normally natural gas, and a major associated $CO_2$ emission. As the highly endothermic steam reforming reaction is facilitated in conventional steam methane reformers (SMR), i.e. fired reformers using large furnaces operating at temperatures in the vicinity of 1000° C., the process economy is heavily favoured by economy of scale to enable high process efficiency and integrated waste heat management. Such plants are therefore difficult to scale down economically due to the integrated design and high upfront capital investment.

The conversion of the hydrocarbon feed gas to synthesis gas by such conventional SMR results in synthesis gas having a H2/CO module of about 3 or higher e.g. 3-5. However, for the use of a synthesis gas for the downstream production via Fischer-Tropsch synthesis of hydrocarbon products such as diesel, the molar steam-to-carbon ratio (S/C ratio) in the synthesis gas has to be reduced so as to lower its $H_2/CO$ molar ratio. However, by steam methane reforming it is typically not possible to reach a sufficiently low $H_2/CO$-molar ratio in the synthesis gas, unless other means such as $CO_2$-addition to the feed or hydrogen removal from the synthesis gas are employed.

In the Fischer-Tropsch (FT) process, CO and hydrogen in the synthesis gas are combined in a number of reactions to produce a variety of hydrocarbons, typically with the formula $C_nH_{(2n+2)}$. A simplified reaction as given below is often used for the FT-synthesis:

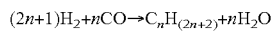

$$(2n+1)H_2 + nCO \rightarrow C_nH_{(2n+2)} + nH_2O$$

where n is typically 10-30 and the formation of methane (n=1) is unwanted.

It should be noted that the FT-synthesis is highly complex and the above equation is a considerable simplification. In practice, the desired $H_2/CO$-ratio in the synthesis gas feed to the FT-synthesis is around 2 such as 1-8-2.2 or preferably 1.9-2.1.

Accordingly, the desired $H_2/CO$ module in the synthesis gas is about 2.0, for instance 1.8-2.2, such as 1.9-2.1.

It is known to achieve this by operating steam reforming with low S/C ratios. For instance, it is possible to produce synthetic fuels such as diesel from natural gas by FT synthesis, in which synthesis gas is produced by the use of a conventional SMR and autothermal reforming in an autothermal reformer (ATR), optionally also with prereforming upstream the conventional SMR. Accordingly, processes/plants are known where, for example, a part of the natural gas feed bypasses the steam methane reformer and enters the autothermal reformer together with recycled tail gas from downstream FT synthesis, and where CO2 from the synthesis gas exiting the autothermal reformer is removed and exported, i.e. CO2 is removed without recycling. Applicant's U.S. Pat. No. 9,353,022 discloses a process which combines the removal of $CO_2$ from the produced syngas with recycling of FT tail gas. Applicant's U.S. Pat. No. 9,828,246 discloses a process and plant for the production of liquid hydrocarbons by Fischer-Tropsch synthesis in which the reforming section of the plant comprises a process line comprising autothermal reforming and a separate process line comprising steam methane reforming.

For large scale plants for the production of diesel from synthesis gas generated from natural gas as the hydrocarbon feed gas, it is well known that the preferred solution is the use of ATR without the use of an upstream conventional SMR, i.e. stand-alone ATR, optionally with a preformer upstream, since among other things, using conventional SMR instead of autothermal reforming in connection with a downstream FT synthesis results in lower overall plant efficiency.

Typically, the hydrocarbon feed gas, i.e. natural gas, is admixed with steam, preheated in a fired heater, passed through a prereformer, then preheated again in a fired heater typically to about 500-700 C and then passed through an autothermal reformer. A portion of the tail gas from downstream Fischer-Tropsch (FT tail gas) is added to this preheated stream or directly to the autothermal reformer, along with an oxygen-rich stream produced in an Air Separation Unit (ASU). The ASU required for the production of oxygen normally represents a significant capital expense. The FT tail gas typically contains $CO_2$ and $N_2$, methane, unconverted $H_2$ and CO together with light hydrocarbons in some cases including olefins formed in the FT synthesis. The recycle of the hydrocarbons increases the overall plant efficiency. The portion of the tail gas which is not recycled is used as fuel for process heaters and other purposes in the plant/process. In some cases, part of the tail gas may be exported either directly or indirectly for example by using the excess gas for producing steam or power.

This traditional way of producing synthesis gas and downstream synthetic fuels conveys an associated $CO_2$ emission.

SUMMARY OF THE INVENTION

It is an object of the present invention to provide a method and system for converting a hydrocarbon feed gas, such as methane rich gas, to a synthesis gas suitable for use in the production of hydrocarbon products, particularly diesel, having lower consumption of oxygen in the ATR and thereby having a higher energy efficiency than prior art methods (processes) and systems (plants).

It is a further object of the invention to provide a sustainable method and system for converting a hydrocarbon feed gas, such as methane rich gas, to a synthesis gas suitable for use in the production of hydrocarbon products, particularly diesel.

It is a further object of the invention to enable the building of compact plants for the production of hydrocarbon products.

It is a further object of the invention to enable building of plants with a high carbon utilization.

These and other objects are solved by the present invention.

Accordingly, the invention relates to more sustainable production of hydrocarbon products from a hydrocarbon feed gas by applying electrically heated steam methane reformer (eSMR) technology that will allow for a reduction of carbon dioxide emissions.

Embodiments of the invention generally relate to a method and system for converting a hydrocarbon feed gas to synthesis gas for use in the production of a liquid hydrocarbon product, particularly a synthetic fuel such as diesel. This hydrocarbon feed gas is preferably natural gas.

A first aspect of the invention relates to a method for producing a synthesis gas for use in the production of a hydrocarbon product, particularly a synthetic fuel, comprising the steps of:

providing a hydrocarbon feed gas, carrying out steam methane reforming in a reforming reactor comprising a pressure shell housing a structured catalyst arranged to catalyze steam reforming of said hydrocarbon feed gas, said structured catalyst comprising a macroscopic structure of an electrically conductive material, said macroscopic structure supporting a ceramic coating, where said ceramic coating supports a catalytically active material; said steam methane reforming comprising the following steps:

i) supplying said hydrocarbon feed gas to the reforming reactor, ii) allowing the hydrocarbon feed gas to undergo steam methane reforming reaction over the structured catalyst and out-letting a synthesis gas from the reforming reactor, and iii) supplying electrical power via electrical conductors connecting an electrical power supply placed outside said pressure shell to said structured catalyst, allowing an electrical current to run through said macroscopic structure material, thereby heating at least part of the structured catalyst to a temperature of at least 500° C., for instance 600, 700, 800 or 900° C., providing at least part of the synthesis gas from step ii) to a synthetic fuel synthesis unit for converting said synthesis gas into said hydrocarbon product and producing a tail gas.

By the term "synthetic fuel synthesis unit" is meant a Fischer-Tropsch (FT) synthesis section comprising one or more FT reactors. The FT synthesis section may also include a Product Workup Unit (PWU) comprising one or more refining units such as hydrorefining unit(s), e.g. a hydrocracking unit, for upgrading the raw hydrocarbon product into the hydrocarbon product. The PWU may be located at the same site as the FT-reactors and other associated units or in a separate location.

The hydrocarbon product is preferably e a synthetic fuel, such as diesel and/or kerosene. The hydrocarbon product can also be in the form of naphta and/or LPG (Liquid Petroleum Gas). For details on FT synthesis section, reference is given to Steynberg A. and Dry M. "Fischer-Tropsch Technology", Studies in Surface Sciences and Catalysts, vol. 152.

In a conventional SMR, the outlet temperature is often 850-900° C. due to mechanical limitations. In the electrical reforming reactor according to the invention, the exit gas temperature can be above 900° C., such as above 950° C., above 1000° C., and even above 1050° C. This increases the methane conversion and the higher temperature in itself also decreases the $H_2$/CO-ratio. Any of these factors contributes improving the economics of a Gas-to-Liquids (GTL) plant, which in the present context means a plant for converting a hydrocarbon feed gas, preferably natural gas, into a synthesis gas and then converting the synthesis gas into a hydrocarbon product, particularly a synthetic fuel such as diesel.

The electrical reforming reactor also avoids the need for combustion of a carbon rich gas to provide heat for the endothermic steam reforming reaction as in a convention SMR. This reduces the emissions of $CO_2$ from the plant and also reduces other emissions associated with combustion such as $NO_x$ and particles. Furthermore, when the electricity needed for the electrical reforming reactor comes from renewable sources the overall emissions of $CO_2$ compared to a conventional SMR and substantially reduced.

The electrical reforming reactor is also significantly more compact than the conventional steam reformer. This has the potential to reduce the overall cost of the plant and thereby also improve economics.

At low plant capacities e.g. below 2000 such as below 1000 barrels hydrocarbon product per day, for instance 300 or 500 barrels per day, it may not be economical to build an Air Separation Unit for a GTL plant.

The use of conventional SMR in connection with the production of synthesis gas for use in the production of hydrocarbon products, is not economically feasible in small scale plants as the capital cost is too high. By the present invention, it is now also possible to more economically design a plant, for instance a plant producing about 300 barrels per day or 500 barrels per day or 1000 barrels of hydrocarbon product per day.

The use of autothermal reforming brings some advantages, particularly when the tail gas produced is recycled to the front-end, i.e. to the reforming section including the reforming reactor and in this case also an autothermal reforming unit. Accordingly, in an embodiment according to the first aspect of the invention, the method further comprises autothermal reforming in an autothermal reforming unit (ATR) after conducting said steam methane reforming for producing said synthesis gas.

In an embodiment according to the first aspect of the invention, the method comprises recycling at least part of said tail gas to upstream said reforming reactor i.e. electrically heated SMR (eSMR) and/or upstream said ATR. This enables further flexibility in the adjustment of the module of said synthesis gas so it is maintained at the desired value—this value typically being in the range 1.8-2.2, preferably 1.9-2.1.

By "tail gas" or "FT tail gas" is meant off-gas from a Fischer-Tropsch synthesis unit, the tail gas comprising: 5-35% vol. CO, 5-35% vol. $H_2$, 5-35% vol. $CO_2$, more than 2% vol. $CH_4$. The tail gas may also comprise higher hydrocarbons such as ethane and propane and including olefins, as well as argon and nitrogen.

By the term "at least part of said tail gas" is meant that all the tail gas or part of it is recycled upstream the reforming reactor or upstream the ATR, or a portion of the tail gas may be recycled to the reforming reactor and another portion to the ATR.

It would also be understood that the term "upstream", e.g. "upstream the ATR" includes also adding the stream directly to the ATR.

Autothermal reforming (ATR), as mentioned previously, is a technology commonly used for the production of synthesis gas (syngas), where the conversion of a hydrocarbon feedstock, such as natural gas, is carried out in a single reactor through the combination of partial combustion and steam reforming. The ATR reactor consists of a burner, a combustion chamber and a fixed bed catalyst section contained in a refractory lined pressure shell. The key elements in the ATR reactor are the burner and the catalyst bed. ATR technology is well-known in the art, for which reference is given to i.a. above mentioned applicant's U.S. Pat. No. 9,828,246.

In an ATR based layout (method or system, or interchangeably process or plant, respectively) according to what is done today, the ATR feed gas is typically heated to the desired inlet temperature of ca. 500-700° C. by a fired heater. This fired heater is fueled by a combustible gas such as the feed gas and/or the tail gas. Hence, the fired heater emits $CO_2$ to the atmosphere. Furthermore, the fired heater is typically a capital intensive and large piece of equipment.

In a traditional layout, tail gas is recycled to the ATR in an amount to provide an $H_2$/CO-ratio in the synthesis gas of 1.8-2.2, preferably 1.9-2.1 depending upon the nature of the FT-synthesis. Typically, the remaining tail gas is used as fuel or for other energy purposes, e.g. to raise steam or generate electricity and in some cases part of the tail gas is even exported.

By the present invention, the fired heater is partly or completely replaced by an electrical steam reformer, i.e. the eSMR. The eSMR does not need fuel and will thereby not emit $CO_2$ or other environmentally undesirable components such as CO, methane, particles, and $NO_x$. If the power for the electrical reformer is produced in part or mainly/exclusively from renewable sources such as wind and/or solar sources, this will also reduce the overall $CO_2$-emissions.

This means that the invention enables a larger part of the produced tail gas can be recycled to the reforming section. Less tail gas is needed to cover the fuel requirements as these are smaller. Recycle of the larger amount of tail gas to the reforming section would in principle lead to an undesirable reduction of the $H_2$/CO-ratio in the synthesis gas. However, this can be countered by adjusting the power supplied to the electrically heated reformer. This will typically mean that the duty of the electrical reforming reactor will be higher in comparison with the fired heater in a stand-alone ATR reference case. The increase in duty will at the same time mean that the oxygen consumption in the ATR is reduced compared to the reference case, thereby also reducing capital expenses in connection with the Air Separation Unit (ASU).

In one embodiment, said reforming reactor i.e. eSMR produces an exit gas, said exit gas has a temperature of 500° C. or higher, such as above 550° C., above 600° C., or about or above 650° C. The exit gas from the eSMR is then directed to the ATR for producing said synthesis gas. Compared to the traditional design using a fired heater for conducting preheating, the new approach according to the present invention may save oxygen.

The normal approach in the art to reduce the oxygen consumption in an ATR plant is to include a heat exchange reformer either in-series or in parallel to the ATR. However, the use of heat exchange reforming involves the risk of metal dusting and high alloy and expensive materials may be needed. The risk of metal dusting is avoided when using an electrical reformer.

Furthermore, the reduction of oxygen consumption in the ATR is obtained without compromising the quality of the syngas in terms of the $H_2$/CO molar ratio, i.e. $H_2$/CO molar ratio of 1.8-2.2, preferably 1.9-2.1, in the synthesis gas is maintained. In an embodiment according to the first aspect of the invention, the electrical power supplied is generated at least partly by means of renewable energy sources. Suitable renewable sources are for instance wind i.e. wind power from wind mills and/or solar energy from e.g. solar panels, and water e.g. hydropower. The reforming reactor according to the invention, i.e. the electrically heated steam methane reformer (eSMR), is a very compact steam reforming reactor, resulting in a lower capital investment than classical (conventional) steam reforming equipment. The hydrocarbons in the hydrocarbon feed gas are preferably mainly methane; however, the hydrocarbon feed gas may also comprise small amounts of higher hydrocarbons. The hydrocarbon feed gas comes preferably from a methane-rich containing source such as natural gas, but because heating is facilitated by electricity, it will be an improvement over existing or conventional fired reformers, i.e. conventional SMR, by saving the plant $CO_2$ emissions.

In one embodiment according to the first aspect of the invention, the production of hydrocarbon products is regulated according to availability of renewable energy.

In a typical process for production of hydrocarbon products including the use of autothermal reforming and optionally also conventional steam methane reforming before the autothermal reforming, natural gas, typically a mixture of predominantly methane with some higher hydrocarbons, nitrogen and $CO_2$, is used as the only carbon-containing material in the feed to the steam methane reformer. The synthesis gas obtained is not optimal for use in the FT synthesis reaction because of the $H_2$/CO ratio. Therefore, it is normal practice in connection with the use of autothermal reforming, to remove the $CO_2$, which is co-produced during the reforming process, and recycle the desired quantity back to the reforming section. The addition of this $CO_2$ to the feed changes the $H_2$/CO ratio. Careful control of the amount of recycled $CO_2$ allows a desirable $H_2$/CO ratio to be achieved.

By the present invention, the required module of the synthesis gas ($H_2$/CO ratio i.e. $H_2$/CO molar ratio) is also obtained by adding $CO_2$ available in the process or imported to the plant to the hydrocarbon feed gas, preferably natural gas, and then reforming the resulting mixture in the eSMR. Also, excess hydrogen may be separated from the synthesis gas.

Accordingly, in an embodiment according to the first aspect of the invention, the method further comprises:
providing a hydrogen separation unit, such as a hydrogen-membrane unit, downstream the reforming reactor and separating excess hydrogen from the synthesis gas stream, and/or
adding CO2 to the hydrocarbon feed gas, preferably by providing a CO2-removal unit downstream the reforming reactor, separating $CO_2$ from the synthesis gas and recycling at least part of said $CO_2$ to the hydrocarbon feed gas.

Again, this enables simple adjustment the module of said synthesis gas is in the range 1.8-2.2, preferably 1.9-2.1, i.e. the $H_2$/CO molar ratio. This embodiment enables also utilization of excess hydrogen in a PWU downstream, e.g. hydrorefining such as hydrocracking, as well as in a purification unit upstream the reforming reactor, for instance in a hydrodesulfurization unit or hydrogenator unit upstream a sulfur absorber.

While adding $CO_2$ to the hydrocarbon feed gas is known in connection with the use of autothermal reforming, it has now also been found, that it is possible to provide such $CO_2$ addition to the hydrocarbon feed gas also in the absence of said autothermal reforming.

In an embodiment according to the first aspect of the invention, the method further comprises: providing a reforming unit, preferably an ATR, for separate reforming of the tail gas and optionally recycling at least a portion of the reformed tail gas to said synthetic fuel synthesis unit, i.e. FT synthesis section. The recycling to the FT synthesis section enables in particular to increase the conversion of the synthesis gas in said FT synthesis section. Preferably also, the method is conducted without autothermal reforming of the synthesis gas.

In an embodiment according to a first aspect of the invention, a combination of steam superheating and steam generation is integrated in the waste heat recovery of the hot synthesis gas product from the reforming reactor and/or the ATR, and the superheated steam is used as steam feedstock in said step of carrying out said steam methane reforming. Waste heat recovery will be from the ATR, if this is included downstream the eSMR. The combination of steam superheating and steam generation may also be used to generate power. Part or all of this power may be used in the eSMR.

In an embodiment according to a first aspect of the invention, the pressure of the gas inside said reforming reactor (eSMR) is between 20 and 100 bar, preferably between 25 and 50 bar, and the temperature of the exit gas from said reforming reactor is between 850 and 1150° C., preferably 900 and 1150° C. These exit gas temperatures are preferably used in an embodiment without the use of autothermal reforming. Where an ATR is used, as described above, the exit gas has a temperature of 500° C. or higher, such as above 550° C., above 600° C., or about or above 650° C., preferably up to 700° C. The exit gas from the eSMR is then directed to the ATR for producing said synthesis gas.

In an embodiment according to a first aspect of the invention, the space velocity evaluated as flow of gas relative to the geometric surface area of the structured catalyst is between 0.6 and 60 $Nm^3/m^2/h$ and/or the flow of gas relative to the occupied volume of the structured catalyst is between 700 $Nm^3/m^3/h$ and 70000 $Nm^3/m^3/h$. Preferably, the flow of gas relative to the occupied volume of the structured catalyst is between 7000 $Nm^3/m^3/h$ and 10000 $Nm^3/m^3/h$.

In an embodiment according to a first aspect of the invention, the plot area of the reforming reactor is between 0.4 $m^2$ and 4 $m^2$. Preferably, the plot area is between 0.5 and 1 $m^2$. Here the term "plot area" is meant to be equivalent to "ground area", i.e. the area of land that the reforming reactor will take up when installed.

In an embodiment according to a first aspect of the invention, the method further comprises providing a plurality of reforming reactors arranged in parallel to each other.

As the plot area is reduced, it is now also possible to significantly reduce the capital expenses (CAPEX) of the plant, while at the same time being able to reduce $CO_2$ emissions, as well as oxygen consumption when ATR is used. In addition, multiple eSMRs i.e. a plurality of eSMRs is possible to arrange in a combined plot area, while still occupying a significantly smaller area than that of a single conventional SMR.

In an embodiment according to the first aspect of the invention, the method further comprises:
prereforming of the hydrocarbon gas together with a steam feedstock in a prereforming unit (prereformer) prior to said steam reforming,
and/or
purifying the hydrocarbon feed gas in a gas purification unit prior to said steam reforming, and/or prior to said prereforming.

Hence, an optional step of pre-reforming may be provided prior to the electrically heated steam methane reforming. In the pre-reforming unit(s) all higher hydrocarbons can be converted to carbon oxides and methane, but the pre-reforming unit(s) are also advantageous for light hydrocarbons. Providing the pre-reforming unit(s), hence pre-reforming step(s), may have several advantages including the provision of an efficient sulphur guard resulting in a practically sulphur free feed gas entering the downstream units. The pre-reforming step(s) may be carried out at temperatures between 300-650° C., preferably 390-500° C., such as 390-480° C. Preferably, the pre-reforming is conducted in one or more adiabatic pre-reforming stages with inter-stage preheating, i.e. with heating in between pre-reforming stages. The steam feedstock added to the pre-reforming may also stem from the superheated steam is used as steam feedstock in said step of carrying out said steam methane reforming. Optionally, where a pre-reforming step is used, the steam is only added to the pre-reforming, i.e. no steam is added to the reforming reactor, as the necessary steam has already been incorporated during the prereforming.

Also, an optional step of purifying the hydrocarbon feed gas in a gas purification unit may be provided prior to said steam reforming, and/or prior to said pre-reforming. In the gas purification unit, the hydrocarbon feed gas, preferably natural gas, impurities such as sulfur, chlorine and heavy metals are removed by use of several catalytic reactors, as is well known for the skilled person. Prior to entering the gas purification unit, a small amount of hydrogen may be added to the natural gas; the natural gas may also be compressed and preheated to the required temperature of the purification unit.

The hydrocarbon feed gas to the reforming reactor is provided as a purified hydrocarbon feed gas, as a pre-reformed hydrocarbon feed gas, as a hydrocarbon feed gas with added steam. All constituents of the hydrocarbon feed gas are pressurized, either separately or jointly, upstream the reforming reactor. Steam is preferably pressurized separately; whilst the other constituents of the hydrocarbon feed gas may be pressurized jointly. The pressure(s) of the constituents of the hydrocarbon feed gas is/are chosen so that the pressure within the reforming reactor lies between 20 to 100 bar, preferably between 25 and 50 bar.

The invention may also enable increasing the carbon utilization, so that between 50% and 100%, preferably more than 60% i.e. between above 70 and 100%, such as between 70% and 90%, of the carbon in the hydrocarbon feed gas is converted into synthetic fuel. This means than between 50% and 100% of the carbon atoms in the hydrocarbon feed gas, e.g. natural gas, can be converted into carbon bounded in hydrocarbon product, e.g. diesel, molecules.

In another embodiment according to the first aspect of the invention, the hydrocarbon feed gas amounts to 20000 $Nm^3/h$ to 200000 $Nm^3/h$.

In a second aspect, the invention relates to a system for producing a synthesis gas for use in the production of a hydrocarbon product, particularly a synthetic fuel, said system comprising:
a reforming reactor comprising a pressure shell housing a structured catalyst arranged to catalyze steam reforming of a feed gas comprising hydrocarbons, said structured catalyst comprising a macroscopic structure of an electrically conductive material, said macroscopic structure supporting a ceramic coating, where said ceramic coating supports a catalytically active material; wherein the reforming reactor moreover comprises an electrical power supply placed outside said pressure shell and electrical conductors connecting said electrical power supply to said structured catalyst, allowing an electrical current to run through said macroscopic structure material to thereby heat at least part of the structured catalyst to a temperature of at least 500° C., for instance 600, 700, 800 or 900° C., a synthetic fuel synthesis unit arranged to receive at least part of the synthesis gas from said reforming reactor for converting said synthesis gas into said hydrocarbon product and producing a tail gas.

In an embodiment according to the second aspect of the invention, the system comprises an autothermal reforming unit (ATR) downstream said reforming reactor, and/or a prereforming unit i.e. preformer upstream said reforming reactor, and/or a gas purification unit for purification of the hydrocarbon gas upstream said prereforming unit and/or upstream said reforming reactor.

In another embodiment according to the second aspect of the invention, the system comprises means such as recycling compressor for recycling at least part of said tail gas to upstream said reforming reactor or upstream said ATR.

In an embodiment according to the second aspect of the invention, the system is absent of an ATR downstream said reforming reactor. The system may still further comprise a prereforming unit upstream said reforming reactor, and/or a gas purification unit for purification of the hydrocarbon gas upstream said prereforming unit and/or upstream said reforming reactor.

In an embodiment according to the second aspect of the invention, the system comprises comprising a reforming unit, preferably an ATR, for separate reforming of the tail gas and optionally also means for recycling at least a portion of the reformed tail gas to said synthetic fuel synthesis unit, i.e. FT synthesis section.

In an embodiment according to the second aspect of the invention, the system is absent of an autothermal reformer unit (ATR) downstream said reforming reactor.

The structured catalyst of the reforming reactor of the system is configured for steam reforming. This reaction takes place according to the following reactions:

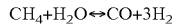

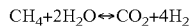

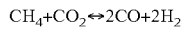

The structured catalyst is composed a metallic structure, a ceramic phase, and an active phase. The metallic structure may be FeCrAlloy, AlNiCo, or similar alloys. The ceramic phase may comprise $Al_2O_3$, $MgAl_2O_4$, $CaAl_2O_4$, $ZrO_2$, or a combination thereof. The catalytically active material may comprise Ni, Ru, Rh, Ir, or a combination thereof.

In an embodiment according to the second aspect of the invention, catalyst pellets are loaded on top of, around, inside, or below the structured catalyst of the reforming reactor. The catalyst material for the reaction may comprise $Ni/Al_2O_3$, $Ni/MgAl_2O_4$, $Ni/CaAl_2O_4$, $Ru/MgAl_2O_4$, or $Rh/MgAl_2O_4$. The catalytically active material may comprise Ni, Ru, Rh, Ir, or a combination thereof. This can improve the overall gas conversion inside the reforming reactor.

In an embodiment, the macroscopic structure(s) has/have a plurality of parallel channels, a plurality of non-parallel channels and/or a plurality of labyrinthic channels. The channels have walls defining the channels. Several different forms and shapes of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without necessarily getting into contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. Moreover, the thickness of the walls should be small enough to provide a relatively large electrical resistance and large enough to provide sufficient mechanical strength. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. In another embodiment, the macroscopic structure of the structured catalyst is cross-corrugated. In general, when the macroscopic structure has parallel channels, the pressure drop from the inlet to the outlet of the reforming reactor system may be reduced considerably compared to a reactor where the catalyst material is in the form of pellets such as a standard SMR.

In an embodiment, the macroscopic structure(s) is/are extruded and sintered structures. Alternatively, the macroscopic structure(s) is/are 3D printed structure(s). A 3D printed structure can be provided with or without subsequent sintering. Extruding or 3D printing a macroscopic structure, and optional subsequent sintering thereof results in a uniformly and coherently shaped macroscopic structure, which can afterwards be coated with the ceramic coating.

Preferably, the macroscopic structure has been manufactured by 3D printing or extrusion of a mixture of powdered metallic particles and a binder to an extruded structure and subsequent sintering of the extruded structure, thereby providing a material with a high geometric surface area per volume. Preferably, the 3D printed extruded structure is sintered in a reducing atmosphere to provide the macroscopic structure. Alternatively, the macroscopic structure is 3D printed a metal additive manufacturing melting process, viz. a 3D printing processes, which do not require subsequent sintering, such as powder bed fusion or direct energy deposition processes. Examples of such powder bed fusion or direct energy deposition processes are laser beam, electron beam or plasma 3D printing processes. As another alternative, the macroscopic structure may have been manufactured as a 3D metal structure by means of a binder-based metal additive manufacturing process, and subsequent sintered in a non-oxidizing atmosphere at a first temperature $T_1$, where $T_1 > 1000°$ C., in order to provide the macroscopic structure.

A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the structured catalyst. Due to close proximity between the heat source and the catalytically active material, the heat transfer is effective, so that the structured catalyst can be very efficiently heated. A compact reforming reactor system in terms of gas processing per reforming reactor system volume is thus possible, and therefore the reforming reactor system housing the structured catalyst may be compact. The reforming reactor system of the invention does not need a furnace and this reduces the overall reactor size considerably. Moreover, it is an advantage that the amount of synthesis gas produced in a single pressure shell is increased considerably compared to known tubular steam reformers. In a standard tubular steam reformer, the amount of synthesis gas produced in a single tube of the tubular steam reformer is up to 500 Nm$^3$/h. In comparison, the reforming reactor of the invention is arranged to produce up to or more than 2000 Nm$^3$/h, e.g. even up to or more than 10000 Nm$^3$/h, within a single pressure shell. This can be done without the presence of $O_2$ in the feed gas and with less than 10% methane in the synthesis gas produced. When a single pressure shell houses catalyst for producing up to 10000 Nm$^3$/h synthesis gas, it is no longer necessary to provide a plurality of pressure shells or means for distributing feed gas to a plurality of such separate pressure shells.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes, which do not require subsequent sintering, such as powder bed fusion or direct energy deposition processes. Examples of such powder bed fusion or direct energy deposition processes are laser beam, electron beam or plasma 3D printing processes.

Preferably, the catalytically active material is particles having a size from 5 nm to 250 nm. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K or combinations thereof. Preferably, the conductors are made of different materials than the macroscopic structure. The conductors may for example be of iron, nickel, aluminum, copper, silver or an alloy thereof. The ceramic coating is an electrically insulating material and will typically have a thickness in the range of around 100 μm, e.g. about 10-500 μm.

The macroscopic structure is advantageously a coherent or consistently intra-connected material in order to achieve electrical conductivity throughout the macroscopic structure, and thereby achieve thermal conductivity throughout the structured catalyst and in particular providing heating of the a catalytically active material supported by the macroscopic structure. By using the coherent or consistently intra-connected material, it is possible to ensure uniform distribution of current within the macroscopic structure and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the macroscopic structure is obtained. It is to be noted that even if further modifications of the macroscopic structure are carried out, such as provision of slits within parts of the macroscopic structure or the implementation of insulating material within the macroscopic structure, the macroscopic structure is still denoted a coherent or consistently intra-connected material.

In an embodiment, the structured catalyst has electrically insulating parts arranged to increase the current path between the conductors to a length larger than the largest dimension of the structured catalyst. The provision of a current path between the conductors larger than the largest dimension of the structured catalyst may be by provision of electrically insulating parts positioned between the conductors and preventing the current running through some part of the structured catalyst. Such electrically insulating parts are arranged to increase the current path and thus increase the resistance through the structured catalyst. In an embodiment, the at least one electrically insulating part has a length arranged to ensure that the minimum current path between the conductors is larger than the largest dimension of the macroscopic structure.

Non-limiting examples of such insulating parts are cuts, slits, or holes in the structure. Optionally, a solid insulating material such as ceramics in cuts or slits in the structure can be used. In a case where the solid insulating material is a porous ceramic material, the catalytically active material may advantageously be incorporated in the pores, by e.g. impregnation. A solid insulating material within a cut or slit assists in keeping the parts of the structured catalyst on the sides of the cut or slit from each other. As used herein, the term "largest dimension of the structured catalyst" is meant to denote the largest inner dimension of the geometrical form taken up by the structured catalyst. If the structured catalyst is box-formed, the largest dimension would be the diagonal from one corner to the farthest corner, also denoted the space diagonal.

It should be noted that even though the current through the structured catalyst may be arranged to twist or wind its way through the structured catalyst due to the electrically insulating parts arranged to increase the current path, the gas passing through the reforming reactor system is inlet at one end of the reforming reactor system, passes through the structured catalyst once before being outlet from the reforming reactor system. Inert material is advantageously present in relevant gaps between the structured catalyst and the rest of the reforming reactor system to ensure that the gas within the reforming reactor system passes through the structured catalyst and the catalytically active material supported thereby.

In an embodiment according to the second aspect of the invention, the length of the gas passage through the structured catalyst is less than the length of the passage of current from one conductor through the structured catalyst and to the next conductor. The ratio of the length of the gas passage to the length of the current passage may be less than 0.6, or 0.3, 0.1, or even down to 0.002.

In an embodiment, the structured catalyst has electrically insulating parts arranged to make the current path through the structured catalyst a zigzag path. Here, the terms "zigzag path" and "zigzag route" is meant to denote a path that has corners at variable angles tracing a path from one conductor to another. A zigzag path is for example a path going upwards, turning, and subsequently going downwards. A zigzag path may have many turns, going upwards and subsequently downwards many times through the structured catalyst, even though one turn is enough to make the path a zigzag path.

In an embodiment according to the second aspect of the invention, the reforming reactor comprises at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors. Thereby it is possible to better protect the connections between the conductor and catalyst, as well as better control of the temperature of the synthesis gas.

Any of the embodiments of the first aspect of the invention may be used in connection with the second aspect of the invention and vice-versa.

The following is a detailed description of embodiments of the invention depicted in the accompanying drawing. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

DETAILED DESCRIPTION OF THE DRAWING

Figure 1A:
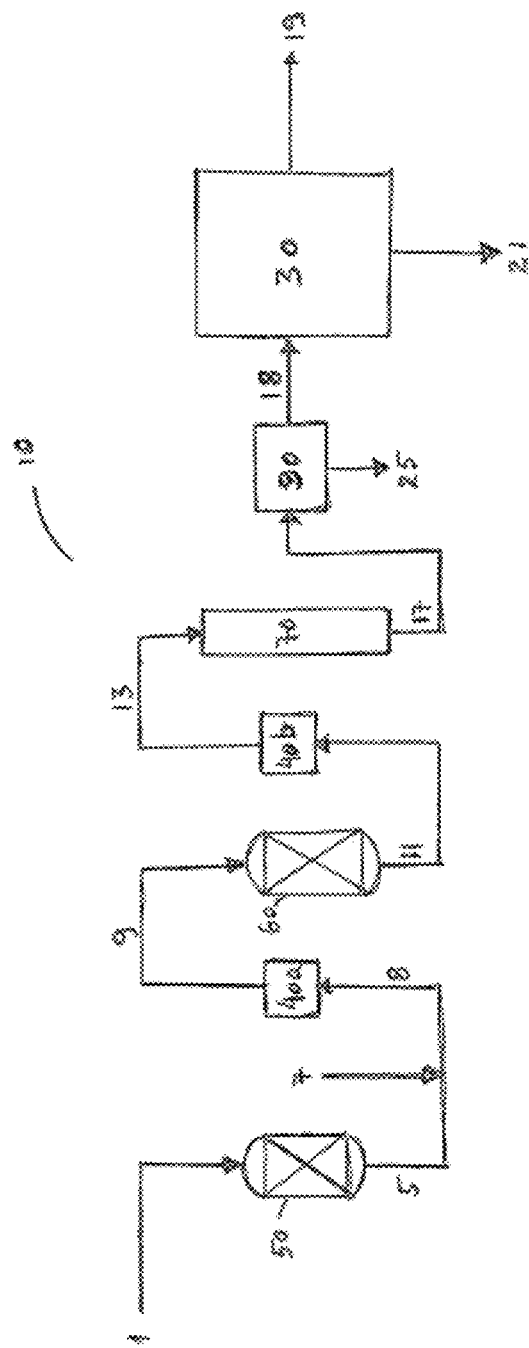
FIGS. 1a and 1b are a schematic drawing of a method and system according to an embodiment of the invention including eSMR yet without ATR (FIG. 1a), and another embodiment including eSMR together with ATR (FIG. 1b).

FIG. 1a is a schematic drawing of a system 10 of a method (process) and system (plant) for producing a synthesis gas for use in the production of a hydrocarbon product, in particular a synthetic fuel, such as diesel. The system 10 for converting a hydrocarbon feed gas 1, preferably natural gas, to synthesis gas 17 and then to hydrocarbon product 19 comprises a reforming section and a FT synthesis section 30. The reforming section comprises a purification unit 50, e.g. a desulfurization unit (sulfur absorber), a pre-reformer 60 and an electrically heated steam methane reforming reactor, eSMR, 70.

The reforming section may also include a hydrogen removal unit 90. The FT synthesis section 30 comprises one or more FT reactors and a Product Workup Unit (PWU).

From the FT synthesis section a hydrocarbon product 19 is produced, such as diesel and/or kerosene, as well as a FT tail gas (tail gas) 21.

The hydrocarbon feed gas 1 is led to the purification unit 50, from which a purified preheated hydrocarbon feed gas 5 is produced. A stream containing steam 7 is added to the purified resulting in feed gas 8 which is passed through a heater 40a to form a preheated feed gas 9. This preheated feed gas 9 is sent to pre-reformer 60. Pre-reformed hydrocarbon feed gas 11 exits the pre-reformer 60 and is heated in an optional second heater 40b resulting in preheated hydrocarbon feed gas 13. This gas 13 is sent to the eSMR 70, where it undergoes steam methane reforming, resulting in a reformed gas 17 which is then led to hydrogen removal unit 90, such as a Pressure Swing Adsorption (PSA) unit or hydrogen-membrane unit. From this unit a hydrogen stream 25 is withdrawn as well as a synthesis gas 18, which is led to the FT synthesis section 30. In the hydrogen removal unit 90, only part of the hydrogen is removed so as to obtain the required H2/CO ratio, i.e. e.g. excess hydrogen from the synthesis gas is removed; alternatively also, only a part of stream 17 is sent through.

Figure 1B:
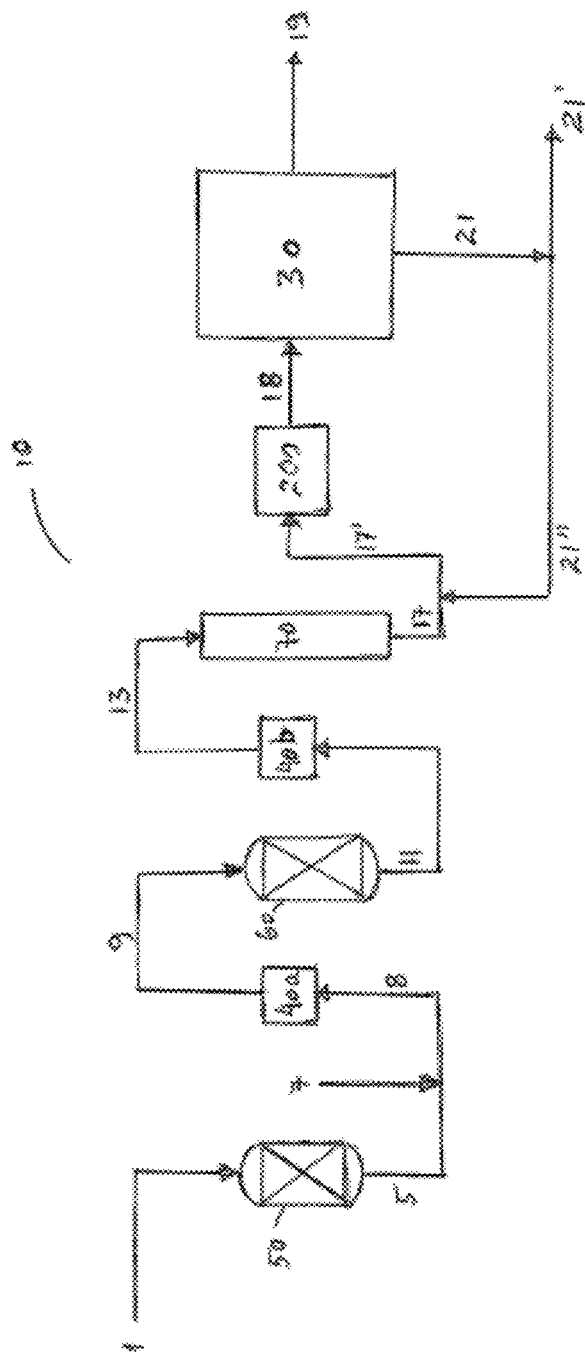

FIG. 1b shows an embodiment according to the invention, in which an ATR 200 is located downstream the eSMR 70 as part of the reforming section. As in FIG. 1a, a reformed gas 17 is produced in the eSMR 70. A part of the FT tail gas 21 from the Fischer Tropsch synthesis section 30 may be used as fuel 21'. Another portion 21" is used as a recycle in the reforming section, by mixing it with reformed gas 17 (exit gas from the eSMR). The resulting reformed gas 17' is then fed to an ATR 200, from which a synthesis gas 18 with the required $H_2$/CO ratio is produced and which is then led to the FT synthesis section 30.

Figure 2:
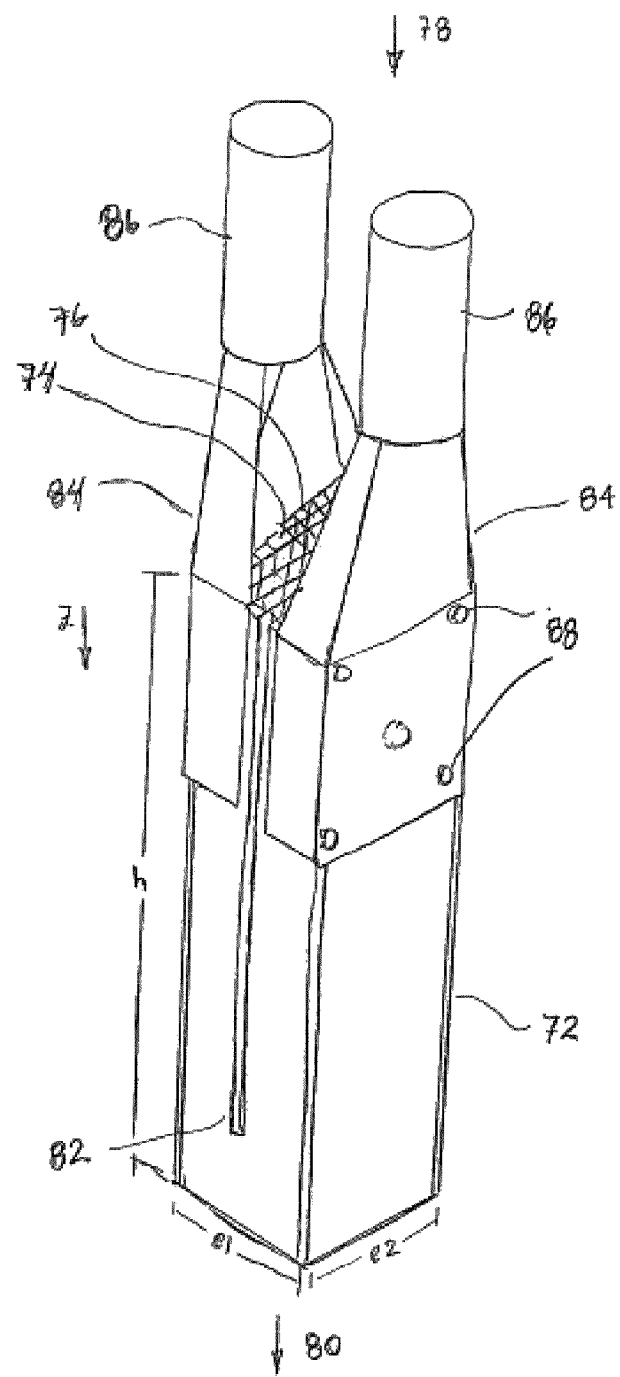
FIG. 2 is a schematic drawing of a particular embodiment of the structured catalyst of an electrically heated reforming reactor (eSMR) in a perspective view.

FIG. 2 shows a particular embodiment of the structured catalyst of the eSMR 70 in a perspective view. The eSMR 70 comprises a structured catalyst 72. The structured catalyst 72 comprises a macroscopic structure 74 that is coated with a ceramic coating impregnated with catalytically active material. Within the structured catalyst 72 are channels 74 extending along the longitudinal direction z of the macroscopic structure. The channels are defined by walls 76. These walls define a number of parallel, preferably square channels 74 when seen from the direction of flow as indicated by the arrows 78, 80. The structured catalyst 72 has a substantially square perimeter when seen from above, defined by the edge lengths e1 and e2. However, the perimeter could also be circular or another shape.

The walls 76 of the structured catalyst 72 are of extruded material coated with a ceramic coating, e.g. an oxide, which has been coated onto the macroscopic structure. In the figure, the ceramic coating is not shown. The ceramic coating is impregnated with catalytically active material. The ceramic coating and thus the catalytically active material are present on every wall within the structured catalyst 72 over which the gas flow flows during operation and interacts with the heated surface of the structured catalyst and the catalytically active material.

Thus, during use in a reactor system for steam reforming, a hydrocarbon feed gas flows through the channels 74 and interacts with the heated surface of the structured catalyst and with the catalytically active material supported by the ceramic coating.

In the structured catalyst 72, a slit 82 has been cut into the structured catalyst 72. This slit 82 forces a current to take a zigzag route, in this instance downwards and subsequently upwards, within the macroscopic structure thereby increasing the current path and thus the resistance and consequently the heat dissipated within the macroscopic structure. The slit 82 within the macroscopic structure may be provided with embedded insulating material in order to ensure that no current flows in the transverse direction of the slit 82.

The channels 74 in the structured catalyst are open in both ends. In use of the structured catalyst in a reactor system, a hydrocarbon feed gas flows through the unit and gets heated via contact with the walls 76 of the channels 74 and by heat radiation. The heat initiates the desired steam reforming process. The walls 76 of the channels 74 may e.g. have a thickness of 0.5 mm, and the ceramic coating coated onto the walls 75 may e.g. have a thickness of 0.1 mm. Even though the arrows 78 and 80 indicate that the flow of the hydrocarbon feed gas is down-flow, the opposite flow direction, viz. an up-flow, is also conceivable.

Connectors 84 are attached the structured catalyst 72. The connectors 84 each connects a part of the structured catalyst 72 to a conductor 86. The conductors 86 are both connected to a power supply (not shown). Each of the connectors 84 are connected to an upper part of the structured catalyst. When the conductors 86 are connected to a power supply, an electrical current is led to the corresponding connector 84 via the conductor and runs through the structured catalyst 72. The slit 82 hinders the current flow in a transverse direction (horizontal direction of FIG. 2) throughout its lengths along the height h of the structured catalyst 72. Therefore, the current runs in a direction downwards as seen in FIG. 2 in the part of the structured catalyst 72 along the slit 82, subsequently it runs transversely to the longitudinal direction below the slit 82 and finally the current runs upwards in the longitudinal direction of the structured catalyst to the other connector 84. The connectors 84 are mechanically fastened to the structured catalyst by means of i.a. mechanical fastening means such as screws and bolts 88. However, additional or alternative fastening means are conceivable. In an embodiment, the electrical power supply generates a voltage of 3V and a current of 400 A. The connectors 84 are e.g. made in materials like iron, aluminum, nickel, copper, or alloys thereof.

As mentioned, the structured catalyst 72 is coated with a ceramic coating, such as an oxide, supporting the catalytically active material. However, the parts of the structured catalyst 72 which are connected to the connectors 84 should not be coated with an oxide. Instead, the macroscopic structure of the structured catalyst should be exposed or connected directly to the connectors 84 in order to obtain a good electrical connection between the macroscopic structure and the connector.

When the connectors 84 and thus the conductors 86 are connected to the same end of the structured catalyst, i.e. the upper end as seen in FIG. 2, the gas entering into a reactor system housing the structured catalyst 72 would be able to cool the connectors 84 and the conductors 86. For instance, the hydrocarbon gas entering into such a reactor system would have a temperature of 400° C. or 500° C. and would thus keep the connectors 84 and conductors 86 from reaching temperatures much higher than this temperature.

Hence, in the embodiment of the eSMR of FIG. 2, the conductors 86 are located at one side of the reactor. The current flows from the one conductor to a second side of the reactor structure and then to the second conductor. The feed gas inlet is located at the first side and the gas outlet is located at the second side. Thereby it is possible to protect the connections between the conductors 86 and catalyst as well as precise control of the temperature of the synthesis gas produced.

Higher temperatures can be reached in an eSMR compared with a fired reformer (conventional SMR), which gives a better conversion of methane in this layout. It should be noted, that the $CO_2$ content in process gas can vary, and therefore, an addition $CO_2$ and/or CO, e.g. from the FT tail gas, to the synthesis gas can be advantageous.

Electrically heated reforming can e.g. use a monolithic-type catalyst heated directly by Joule heating to supply the heat for the reaction. In its essence, the eSMR 70 is envisioned as a pressure shell having a centrally placed catalytic monolith, which is connected to an externally placed power supply by a conductor threaded through a dielectric fitting in the shell. The shell of the eSMR is refractory lined to confine the high-temperature zone to the center of the eSMR.

From a reforming reactor point of view, the eSMR has several advantages over a conventional fired reformer. One of the most apparent is the ability to make a significantly more compact reactor design when using electrically heated technology, as the reforming reactor no longer is confined to a system of high external heat transfer area. A size reduction of two orders of magnitudes is conceivable. This translates into a significantly lower capital investment of this technology. The combined preheating and reforming section of an eSMR (including power supply) configuration was estimated to have a significant lower capital investment. As the synthesis gas preparation section of a FT synthesis plant, accounts for more than 60% of the capital investment in a classical fired reformer based GTL plant, a drastic saving on the reformer equipment will translate into a significant reduction in the cost of a plant based on eSMR.

Figure 3A:
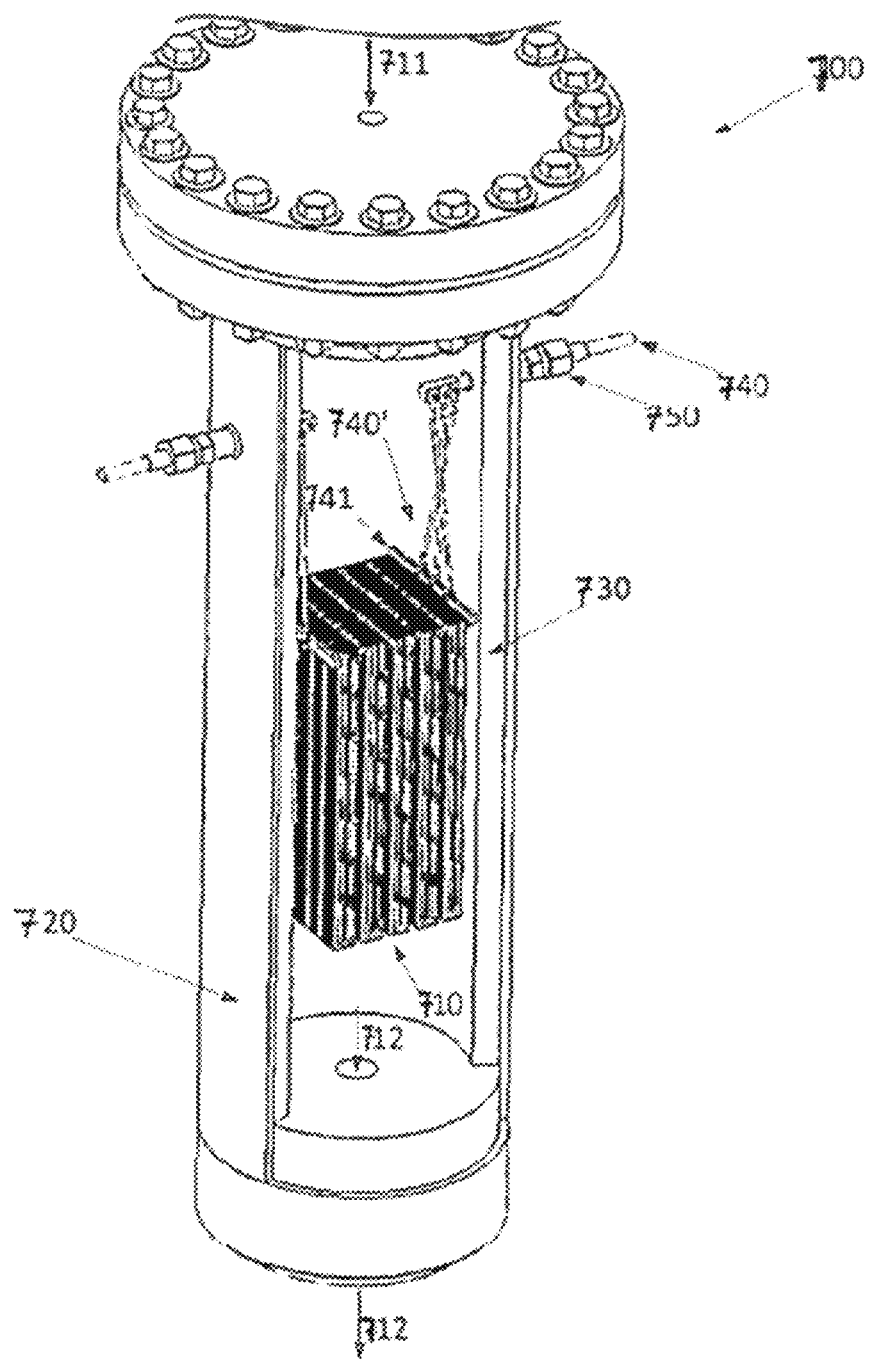
FIG. 3a shows a cross section through a partial view of an embodiment of an eSMR with a structured catalyst comprising an array of macroscopic structures, in a cross section.
Figure 3B:
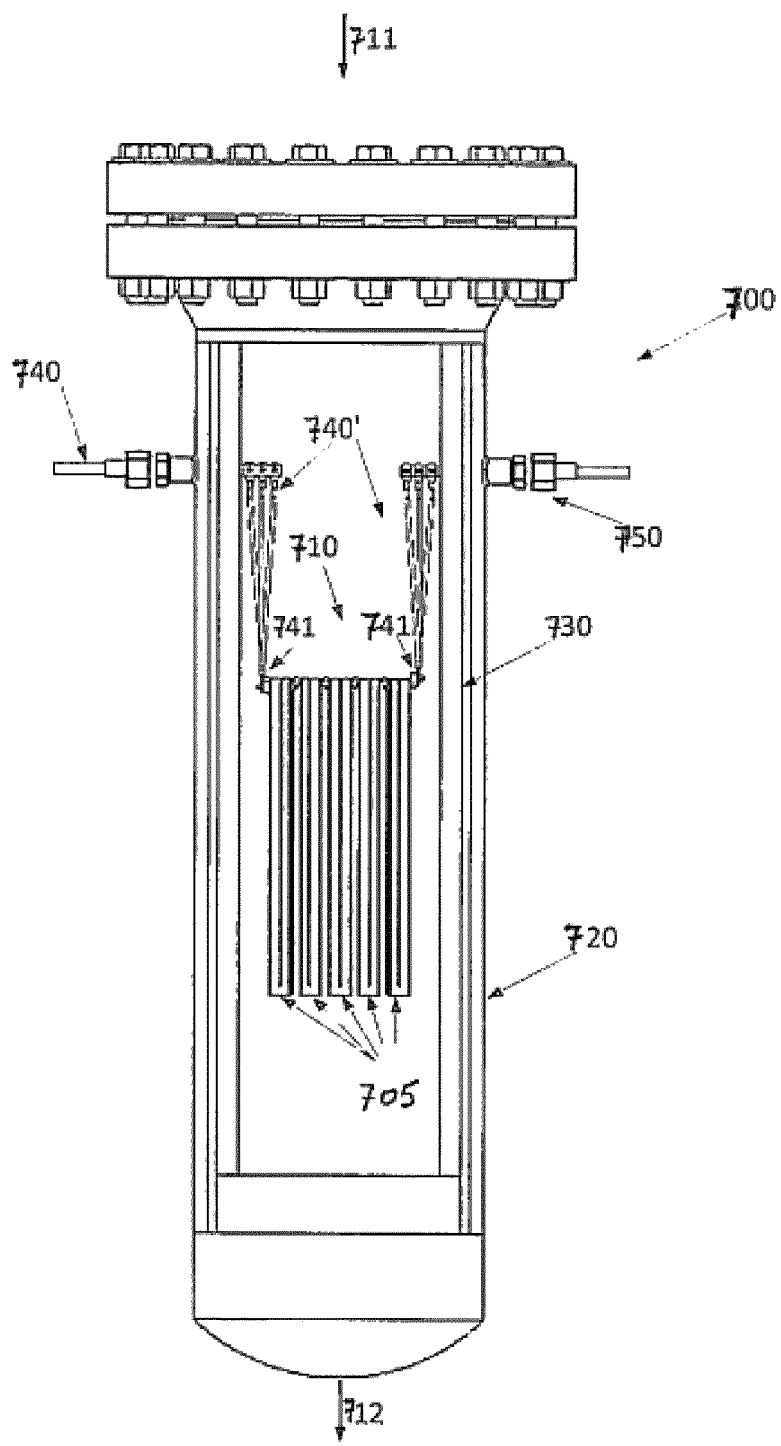
FIG. 3b shows the eSMR of FIG. 3a with a part of the pressure shell and heat insulation layer removed.

Now turning to FIGS. 3a and 3b. FIG. 3a shows a cross section through an embodiment of an eSMR 700 according to the invention. The eSMR 700 comprises a structured catalyst 710, arranged as an array of macroscopic structures 705. Each macroscopic structure 705 in the array is coated with a ceramic coating impregnated with catalytically active material. The eSMR 700 moreover comprises conductors 740, 740' connected to a power supply (not shown in the figures) and to the structured catalyst 710, viz. the array of macroscopic structures. The conductors 740, 740' are led through the wall of a pressure shell 720 housing the structured catalyst and through insulating material 730 on the inner side of the pressure shell, via fittings 750. The conductors 740' are connected to the array of macroscopic structures 705 by conductor contact rails 741. In an embodiment, the electrical power supply supplies a voltage of 26V and a current of 1200 A. In another embodiment, the electrical power supply supplies a voltage of 5V and a current of 240 A. The current is led through electrical conductors 740, 740' to conductor contact rails 741, and the current runs through the structured catalyst 710 from one conductor contact rail 741, e.g. from the conductor contact rail seen to the left in FIG. 3a, to the other conductor contact rail 741, e.g. the conductor contact rail seen to the right in FIG. 3a. The current can be both alternating current, and e.g. run alternating in both directions, or direct current and run in any of the two directions.

The macroscopic structures 705 are made of electrically conductive material. Especially preferred is the alloy kanthal consisting of aluminum, iron and chrome. The ceramic coating, e.g. an oxide, coated onto the structure catalysts is impregnated with catalytically active material. The conductors 740, 740' are made in materials like iron, aluminum, nickel, copper or alloys thereof.

During operating, a feedstock such as prereformed feed gas comprising hydrocarbons and steam enters the eSMR 700 from above as indicated by the arrow 711. Exit gas leaves the eSMR from the bottom thereof as indicated by the arrow 712.

The invention is further specifically described by the following points:

1. A method for producing a synthesis gas for use in the production of a hydrocarbon product, particularly a synthetic fuel, said method comprising the steps of:
    providing a hydrocarbon feed gas,
    carrying out steam methane reforming in a reforming reactor comprising a pressure shell housing a structured catalyst arranged to catalyze steam reforming of said hydrocarbon feed gas, said structured catalyst comprising a macroscopic structure of an electrically conductive material, said macroscopic structure supporting a ceramic coating, where said ceramic coating supports a catalytically active material; said steam methane reforming comprising the following steps:
        i) supplying said hydrocarbon feed gas to the reforming reactor,
        ii) allowing the hydrocarbon feed gas to undergo steam methane reforming reaction over the structured catalyst and out-letting a synthesis gas from the reforming reactor, and
        iii) supplying electrical power via electrical conductors connecting an electrical power supply placed outside said pressure shell to said structured catalyst, allowing an electrical current to run through said macroscopic structure material, thereby heating at least part of the structured catalyst to a temperature of at least 500° C.,
    providing at least part of the synthesis gas from step ii) to a synthetic fuel synthesis unit for converting said synthesis gas into said hydrocarbon product and producing a tail gas.
2. The method of point 1, further comprising autothermal reforming in an autothermal reforming unit (ATR) after conducting said steam methane reforming for producing said synthesis gas.
3. The method of point 1 or 2, comprising recycling at least part of said tail gas to upstream said reforming reactor and/or upstream said ATR.
4. The method according to any of points 1 to 3, wherein the electrical power supplied is generated at least partly by means of renewable energy sources.
5. The method according to any of points 1 or 4, further comprising:
    providing a hydrogen separation unit, such as a hydrogen-membrane unit, downstream the reforming reactor and separating excess hydrogen from the synthesis gas stream, and/or
    adding $CO_2$ to the hydrocarbon feed gas, preferably by providing a $CO_2$-removal unit downstream the reforming reactor, separating $CO_2$ from the synthesis gas and recycling at least part of said $CO_2$ to the hydrocarbon feed gas.
6. The method according to any of points 1 to 5, further comprising: providing a reforming unit, preferably an ATR, for separate reforming of the tail gas and optionally recycling at least a portion of the reformed tail gas to said synthetic fuel synthesis unit.
7. The method according to any of the points 1 to 6, wherein a combination of steam superheating and steam generation is integrated in waste heat recovery of said synthesis gas from the reforming reactor and/or the ATR, and wherein the superheated steam is used as steam feedstock in said step of carrying out said steam methane reforming.
8. The method according to any of the points 1 to 7, wherein the pressure of the gas inside said reforming reactor is between 20 and 100 bar, preferably between 25 and 50 bar, and the temperature of the exit gas from said reforming reactor is between 850 and 1150° C., preferably 900 and 1150° C.
9. The method according to any of the points 1 to 8, further comprising:
    pre-reforming of the hydrocarbon gas together with a steam feedstock in a pre-reforming unit prior to said steam reforming,
    and/or
    purifying the hydrocarbon feed gas in a gas purification unit prior to said steam reforming, and/or prior to said pre-reforming.
10. A system for producing a synthesis gas for use in the production of a hydrocarbon product, particularly a synthetic fuel, said system comprising:
    a reforming reactor comprising a pressure shell housing a structured catalyst arranged to catalyze steam reforming of a feed gas comprising hydrocarbons, said structured catalyst comprising a macroscopic structure of an electrically conductive material, said macroscopic structure supporting a ceramic coating, where said ceramic coating supports a catalytically active material; wherein the reforming reactor moreover comprises an electrical power supply placed outside said pressure shell and electrical conductors connecting said electrical power supply to said structured catalyst, allowing an electrical current to run through said macroscopic structure material to thereby heat at least part of the structured catalyst to a temperature of at least 500° C.,
    a synthetic fuel synthesis unit arranged to receive at least part of the synthesis gas from said reforming reactor for converting said synthesis gas into said hydrocarbon product and producing a tail gas.
11. The system according to point 10, comprising an autothermal reforming unit (ATR) downstream said reforming reactor, and/or a prereforming unit upstream said reforming reactor, and/or a gas purification unit for purification of the hydrocarbon gas upstream said pre-reforming unit and/or upstream said reforming reactor.
12. The system according to point 10, wherein the system is absent of an autothermal reformer unit (ATR) downstream said reforming reactor.
13. The system according to any of points 10-12, comprising a reforming unit, preferably an ATR, for separate reforming of the tail gas and optionally also means for recycling at least a portion of the reformed tail gas to said synthetic fuel synthesis unit.
14. The system according to any of points 10-13, wherein catalyst pellets are loaded on top of, around, inside, or below the structured catalyst of the reforming reactor.
15. The system according to any of points 10 to 14, wherein the reforming reactor comprises at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors.

16. The system according to any of points 10 to 15, wherein the length of the gas passage through the structured catalyst is less than the length of passage of current from one conductor through the structured catalyst and to the next conductor.

17. The method according to any of points 1 to 9, wherein the space velocity evaluated as flow of gas relative to the geometric surface area of the structured catalyst is between 0.6 and 60 $Nm^2/m^2/h$ and/or wherein the flow of gas relative to the occupied volume of the structured catalyst is between 700 $Nm^3/m^3/h$ and 70000 $Nm^3/m^3/h$.

18. The method according to any of points 1-9 and 17, wherein the plot area of said reforming reactor is between 0.4 $m^2$ and 4 $m^2$.

19. The method according to any of points 1-9 and 17-18, wherein the hydrocarbon feed gas amounts to 20000 $Nm^3/h$ to 200000 $Nm^3/h$.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A method for producing a synthesis gas for use in the production of a hydrocarbon product, said method comprising the steps of:
    providing a hydrocarbon feed gas,
    carrying out steam methane reforming in a reforming reactor comprising a pressure shell housing a structured catalyst arranged to catalyze steam reforming of said hydrocarbon feed gas, said structured catalyst comprising a macroscopic structure of an electrically conductive material, said macroscopic structure supporting a ceramic coating, where said ceramic coating supports a catalytically active material; said steam methane reforming comprising the following steps:
    i) supplying said hydrocarbon feed gas to the reforming reactor,
    ii) allowing the hydrocarbon feed gas to undergo steam methane reforming reaction over the structured catalyst and out-letting a synthesis gas from the reforming reactor, and
    iii) supplying electrical power via electrical conductors connecting an electrical power supply placed outside said pressure shell to said structured catalyst, allowing an electrical current to run through said macroscopic structure material, thereby heating at least part of the structured catalyst to a temperature of at least 500° C.,
    providing at least part of the synthesis gas from step ii) to a synthetic fuel synthesis unit for converting said synthesis gas into said hydrocarbon product and producing a tail gas.

2. The method of claim 1, further comprising autothermal reforming in an autothermal reforming unit (ATR) after conducting said steam methane reforming for producing said synthesis gas.

3. The method of claim 1, comprising recycling at least part of said tail gas to upstream said reforming reactor and/or upstream said ATR.

4. The method according to claim 1, wherein the electrical power supplied is generated at least partly by means of renewable energy sources.

5. The method according to claim 1, further comprising:
    providing a hydrogen separation unit downstream the reforming reactor and separating excess hydrogen from the synthesis gas stream,
and/or
    adding $CO_2$ to the hydrocarbon feed gas.

6. The method according to claim 1, further comprising: providing a reforming unit for separate reforming of the tail gas and optionally recycling at least a portion of the reformed tail gas to said synthetic fuel synthesis unit.

7. The method according to claim 1, wherein a combination of steam superheating and steam generation is integrated in waste heat recovery of said synthesis gas from the reforming reactor and/the ATR, and wherein the superheated steam is used as steam feedstock in said step of carrying out said steam methane reforming.

8. The method according to claim 1, wherein the pressure of the gas inside said reforming reactor is between 20 and 100 bar, and the temperature of the exit gas from said reforming reactor is between 85° and 1150° C.

9. The method according to claim 1, further comprising:
    pre-reforming of the hydrocarbon gas together with a steam feedstock in a pre-reforming unit prior to said steam reforming,
and/or
    purifying the hydrocarbon feed gas in a gas purification unit prior to said steam reforming, and/or prior to said pre-reforming.

10. A system for producing a synthesis gas for use in the production of a hydrocarbon product, said system comprising:
    a reforming reactor comprising a pressure shell housing a structured catalyst arranged to catalyze steam reforming of a feed gas comprising hydrocarbons, said structured catalyst comprising a macroscopic structure of an electrically conductive material, said macroscopic structure supporting a ceramic coating, where said ceramic coating supports a catalytically active material; wherein the reforming reactor moreover comprises an electrical power supply placed outside said pressure shell and electrical conductors connecting said electrical power supply to said structured catalyst, allowing an electrical current to run through said macroscopic structure material to thereby heat at least part of the structured catalyst to a temperature of at least 500° C.,
    a synthetic fuel synthesis unit arranged to receive at least part of the synthesis gas from said reforming reactor for converting said synthesis gas into said hydrocarbon product and producing a tail gas.

11. The system according to claim 10, comprising an autothermal reforming unit (ATR) downstream said reforming reactor, and/or a prereforming unit upstream said reforming reactor, and/or a gas purification unit for purification of the hydrocarbon gas upstream said prereforming unit and/or upstream said reforming reactor.

12. The system according to claim 10, wherein the system is absent of an autothermal reformer unit (ATR) downstream said reforming reactor.

13. The system according to claim 10, comprising a reforming unit for separate reforming of the tail gas and optionally also means for recycling at least a portion of the reformed tail gas to said synthetic fuel synthesis unit.

14. The system according to claim 10, wherein catalyst pellets are loaded on top of, around, inside, or below the structured catalyst of the reforming reactor.

15. The system according to claim 10, wherein the reforming reactor comprises at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to a first end of said structured catalyst than to a second end of said structured catalyst, and wherein the structured catalyst is constructed to direct an electrical current to run from one conductor substantially to the second end of the structured catalyst and return to a second of said at least two conductors.

16. The system according to claim 10, wherein the length of the gas passage through the structured catalyst is less than the length of passage of current from one conductor through the structured catalyst and to the next conductor.

17. The method according to claim 1, wherein the method is configured for producing a synthesis gas for use in the production of a synthetic fuel.

18. The system according to claim 10, wherein the system is configured for producing a synthesis gas for use in the production of a synthetic fuel.

* * * * *